United States Patent [19]
Riedel

[11] 3,721,533
[45] March 20, 1973

[54] METHOD OF EXTRACTING URANIUM FROM SEAWATER

[75] Inventor: Hans-Jurgen Riedel, Julich, Germany

[73] Assignee: Kernforschungsanlage Julich Gesellschaft mit beschrankter Haftung, Julich, Germany

[22] Filed: June 8, 1970

[21] Appl. No.: 44,628

[30] Foreign Application Priority Data

June 6, 1969 Germany....................P 19 28 864.3

[52] U.S. Cl. .............................23/337, 252/301.1 R
[51] Int. Cl. .............................................C01g 56/00
[58] Field of Search....................23/337; 252/301.1 R

[56] References Cited

UNITED STATES PATENTS 3,428,568    2/1969    Harker et al. ......................252/301.1

FOREIGN PATENTS OR APPLICATIONS 977,460    12/1964    Great Britain..........................23/337

OTHER PUBLICATIONS

Ogata et al., "Collection of Uranium in Seawater" Nuc. Sci. Abst. Vol. 23, No. 12, June 30, 1969, Abst. No. 21798.

Primary Examiner—Benjamin R. Padgett
Assistant Examiner—Rodger L. Tate
Attorney—Karl F. Ross

[57] ABSTRACT

A method of extracting uranium in the form of tri-carbonate complexes of $UO_2^{++}$ from seawater or other liquids rich in metal ions wherein the seawater is acidified to a pH of approximately 5 (e.g. with hydrochloric acid or $HNO_3$) and then is treated with ultramarine blue in an ion-exchange relationship until equilibrium is reached in the distribution of uranium between the ultramarine blue and the seawater. Elution of the uranium is carried out with an alkali carbonate solution.

10 Claims, No Drawings

METHOD OF EXTRACTING URANIUM FROM SEAWATER

FIELD OF THE INVENTION

My present invention relates to a method of extracting uranium from seawater and, more particularly, to a method of economically removing uranium from seawater without significant interference from the other metals dissolved therein.

BACKGROUND OF THE INVENTION

Naturally occurring seawater contains uranium generally in the form of a tricarbonate complex of $UO_2^{++}$ 3.3 μg/liter to depths of 400 meters, in substantially all of the terrestrial oceans.

It has already been proposed to recover uranium from seawater by means of ion-exchange materials. Ion exchangers for this purpose have included various organic and inorganic materials and especially ion-exchange resins. Earlier efforts along these lines have, however, been unsuccessful because of the insufficient selectivity of the ion-exchange material in the presence of high concentrations of ions of other metals. In some earlier systems it was not uncommon for a contact time for recovery of uranium to range between 36 and 112 days and the yield to be 1.3 to 1010 μg of uranium per gram of the ion-exchange materials. Such contact times were wholly unsatisfactory on economic grounds.

Other systems have made use of inorganic substances such as basic zinc carbonate or $Ti(OH)_4$ as ion-exchange materials. Sodium carbonate solutions may be used to elute the uranium from zinc carbonate ion exchanges in a rapid manner, although here too the long contact times and poor ion-exchange capacity have prevented commercial utilization of the process. The same holds true for the use of $Ti(OH)_4$ ion exchangers. Problems surrounding the use of the latter material as an ion-exchange substance in the recovery of uranium are discussed in *NATURE*, vol. 203, pg. 1110 (1964).

OBJECTS OF THE INVENTION

It is an object of the present invention, therefore, to provide an improved method of recovering uranium from seawater.

Another object of the invention is to provide a process for extracting uranium from seawater which is able to process large quantities of seawater over short periods of time, has a reduced residence time per unit volume of seawater by comparison with earlier systems and generally is more economical and efficient than earlier methods of recovering uranium from seawater.

Another object of this invention is to provide a method of extracting uranium from seawater which has a high yield of uranium per unit quantity of the treating material.

Yet another object of this invention is to provide a low-cost improved process for the ion-exchange extraction of uranium from seawater.

DESCRIPTION OF THE INVENTION

I have discovered, most surprisingly, that a particular mineral material which has been known to contain mobile sodium ions forms an excellent ion-exchange substance for extracting $UO_2^{++}$ ions from seawater, even in the presence of the large concentrations of sodium ions which characterize seawater. More specifically, I have found that acidified seawater, when treated with ultramarine blue such that the seawater/ultramarine blue volume ratio is approximately 100:1, gives rise to an economical and rapid extraction of uranium in the form of the $UO_2^{++}$ ions by an ion exchange with the ultramarine blue, the uranium being eluted rapidly and efficiently by treatment of the mineral with alkali carbonate solutions.

Ultramarine blue occurs naturally as the mineral lapis lazuli and is commercially available in a synthetic form generally made by igniting a mixture of kaolin, sodium carbonate or sodium sulphate, sulphur and carbon. The resulting product is believed to have the formula $Na_7Al_6Si_6O_{24}S_2$ and may be used in either its natural or synthetic states.

According to the present invention, therefore, the method of recovering uranium from seawater in which the uranium is contained as $UO_2^{++}$, generally as a carbonate complex, comprises the steps of acidifying the seawater with HCl or another mineral acid obtained, for example, as a waste product in some chemical process (pickling acids from metallurgical plants), treating the acidified seawater with ultramarine blue in a volume ratio of the seawater to ultramarine blue of about 100:1 under agitation until equilibrium between the ion-exchange substances and the seawater is achieved, and thereafter eluting the uranium from the ultramarine blue by treating it with an alkali carbonate solution. According to a more specific feature of this invention, the agitation of the ultramarine blue in the seawater is carried out by stirrer-type (paddle) mixers or by bubbling air through the mixture while the alkali carbonate solution is a 1 molar solution of the alkali metal carbonate in water. Preferably the lower cost synthetic ultramarine blue is employed.

It has already been noted that the invention is indeed surprising because ultramarine blue contains, in its lattice structure, mobile $Na^+$ ions and one would expect such mobile ions to interfere with the ion-exchange pickup of $UO_2^{++}$ ions, especially in seawater having a high $Na^+$ concentration. This, however, is not the case and indeed a feature of this invention resides in treating the ultramarine blue, prior to its use for the ion-exchange removal of uranium from seawater, with a sodium chloride solution to increase the uranium-acceptance characteristics of the $Na^+$ sites of the ion-exchange material. This preliminary treatment may take place with agitation.

Preferably the ultramarine blue is used in a particle size below 0.2 mm. Acidification is carried out until the pH of the seawater is brought down to about pH=5 which has been found most effective for the efficiency of the ion-exchange pickup of $UO_2^{++}$ in the presence of the tricarbonate complexes mentioned earlier. The alkali carbonate is preferably sodium carbonate and the most advantageous ratio (volume) of sodium carbonate solution to ultramarine blue during elution is 50:1. It should be noted that I prefer to use batch methods in which during both elution and uranium extraction, the ion-exchange resin is dispersed by agitation in the respective liquid, but that column ion-exchange extraction and elution may also be used in accordance with conventional principles.

SPECIFIC EXAMPLE 10 g of synthetic ultramarine blue with a particle size of less than 0.2 mm (0.05 to 0.19 mm) was treated with 100 ml of a 1-molar sodium chloride solution (aqueous) under agitation. The ion-exchange material was filtered and dried at a temperature of 110° C.

One liter of seawater, for test purposes enriched to 81.6 mg of uranium as the tricarbonate complex, was acidified with $HNO_3$ to a pH of 5. The previously treated ultramarine blue was introduced into the seawater with mechanical agitation and maintained in contact therewith for two hours. 52.6 percent of the uranium of the original seawater was picked up by the ultramarine blue. After filtering to recover the ion-exchange material, the latter was treated with one liter of 1-molar aqueous sodium carbonate solution under mechanical agitation for a period of two hours. After this period, 97 percent of the adsorbed uranium was found to be present in the elution solution, this percentage rising to 99.6 percent for an elution treatment of four hours.

Approximately a proportional amount of uranium was adsorbed from nonenriched seawater using the same ion-exchange material and similar results were obtained when HCl was substituted for the $HNO_3$.

I claim:

1. A method of extracting uranium from water containing $UO_2^{++}$ ions, comprising the steps of:
   a. contacting said water with ultramarine blue to effect a ion exchange therebetween and transfer at least part of the uranium to the ultramarine blue; and
   b. thereafter eluting the uranium from the ultramarine blue by treating the latter with an aqueous alkali carbonate solution.

2. The method defined in claim 1 wherein the ultramarine blue is selected from the group which consists of lapis lazuli and synthetic ultramarine blue and is maintained in contact with the water in step (a) until equilibrium is reached in the distribution of the uranium between the water and the ultramarine blue, said water being seawater and being present in proportion to the ultramarine blue in step (a) in a volume ratio of about 100:1, said method further comprising acidifying the seawater prior to its treatment in step (a).

3. The method defined in claim 2 wherein said ultramarine blue is agitated in said water in step (a) and said alkali carbonate solution is approximately of 1 molar concentration in step (b).

4. The method defined in claim 3 wherein said ultramarine blue is synthetic ultramarine blue.

5. The method defined in claim 3 wherein said ultramarine blue is used in step (a) with a particle size below about 0.2 mm.

6. The method defined in claim 3 wherein said seawater is acidified to a pH of about 5 by the addition of a mineral acid thereto.

7. The method defined in claim 6 wherein said alkali carbonate is sodium carbonate.

8. The method defined in claim 7 wherein said alkali carbonate is used to treat said ultramarine blue in step (b) in a volume ratio therewith of about 50:1.

9. The method defined in claim 8 wherein the ultramarine blue is agitated in said solution in step (b).

10. The method defined in claim 9, further comprising the step of pretreating the ultramarine blue prior to step (a) with a sodium chloride solution and drying the pretreated ultramarine blue.

* * * * *